United States Patent
Watanabe

(10) Patent No.: US 8,031,653 B2
(45) Date of Patent: Oct. 4, 2011

(54) WIRELESS COMMUNICATION DEVICE AND METHOD FOR DETERMINING A WIRELESS TRANSMISSION METHOD

(75) Inventor: Kazuhiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1093 days.

(21) Appl. No.: 11/637,070

(22) Filed: Dec. 12, 2006

(65) Prior Publication Data

US 2007/0161395 A1 Jul. 12, 2007

(30) Foreign Application Priority Data

Dec. 20, 2005 (JP) .............................. P2005-365768

(51) Int. Cl.
*H04W 4/00* (2009.01)
(52) U.S. Cl. .................. 370/328; 455/404.2; 455/456.1; 455/456.2; 455/456.3; 455/525
(58) Field of Classification Search ............... 455/456.1, 455/456.2, 456.3, 404.2, 525; 370/328
See application file for complete search history.

(56) References Cited

U.S. PATENT DOCUMENTS

| | | | | |
|---|---|---|---|---|
| 5,745,224 A | * | 4/1998 | Oda et al. ..................... | 356/4.01 |
| 6,486,992 B1 | | 11/2002 | Sasaki et al. | |
| 6,826,162 B2 | * | 11/2004 | Haines et al. .................. | 370/332 |
| 7,205,931 B2 | * | 4/2007 | Gila et al. ...................... | 342/127 |
| 7,379,739 B2 | * | 5/2008 | Rajkotia et al. ............... | 455/439 |
| 2002/0077142 A1 | * | 6/2002 | Sato et al. ..................... | 455/525 |
| 2002/0142782 A1 | * | 10/2002 | Berliner et al. ............... | 455/456 |
| 2003/0195723 A1 | * | 10/2003 | Bensky et al. ................ | 702/189 |
| 2005/0003814 A1 | | 1/2005 | Saito et al. | |

FOREIGN PATENT DOCUMENTS

| | | |
|---|---|---|
| JP | 11-155172 | 6/1999 |
| JP | 2000-354271 | 12/2000 |
| JP | 2002-218526 | 8/2002 |
| JP | 2003-051781 | 2/2003 |
| JP | 2004-289815 | 10/2004 |
| JP | 3620563 | 11/2004 |

* cited by examiner

*Primary Examiner* — Rafael Pérez-Gutiérrez
*Assistant Examiner* — Liton Miah
(74) *Attorney, Agent, or Firm* — Finnegan, Henderson, Farabow, Garrett & Dunner, L.L.P.

(57) ABSTRACT

A wireless communication device includes a wireless transmitting section, a distance measuring section, a transmission method sorting section, a link quality determining section, and a wireless transmission method determining section. The wireless transmitting section performs communication using one of a plurality of predetermined wireless transmission methods. The distance measuring section measures a distance between the wireless communication device and a communication partner device. The transmission method sorting section sorts out one or more suitable wireless transmission methods from the plurality of wireless transmission methods on the basis of the distance measured by the distance measuring section. The link quality determining section determines a link quality of the communication. The wireless transmission method determining section determines the wireless transmission method to be employed by the wireless transmitting section according to the link quality from the wireless transmission methods sorted by the transmission method sorting section.

3 Claims, 8 Drawing Sheets

WIRELESS COMMUNICATION DEVICE AND METHOD FOR DETERMINING A WIRELESS TRANSMISSION METHOD

CROSS REFERENCES TO RELATED APPLICATIONS

The present invention contains subject matter related to Japanese Patent Application JP 2005-365768 filed in the Japanese Patent Office on Dec. 20, 2005, the entire contents of which are incorporated herein by reference.

BACKGROUND OF THE INVENTION

1. Field of the Invention

The present invention relates to wireless communication devices. In particular, the present invention relates to a wireless communication device configured to select one of a plurality of predetermined wireless transmission methods and perform communication using the selected method, a processing method for the same, and a program causing a computer to execute the method.

2. Description of the Related Art

Recently, in many wireless communication systems, wireless transmission methods are switched according to a state of a link (propagation path) of wireless communication in order to improve communication throughput and reduce fluctuation. Particularly, in view of fading that is a phenomenon specific to wireless communication, there are some wireless communication systems that estimate a change in a signal level by a parameter such as an SNR (Signal to Noise Ratio), an RSSI (Received Signal Strength Indicator), and a PER (Packet Error Rate) and switch wireless communication methods on the basis of this information.

For example, a control device which switches modulation techniques employed in a conversion circuit of a transmitter on the basis of an error rate obtained in an error correction circuit of a receiver has been suggested for using in such wireless communication system (see, for example, Japanese Patent No. 3620563 (FIG. 4)).

SUMMARY OF THE INVENTION

A wireless transmission method may be switched on the basis of a change in signal level, such as a signal to noise ratio (SNR) and a received signal strength indicator (RSSI). However, SNR and RSSI significantly change due to movement of a wireless communication device and an arrangement of surrounding wireless communication devices as time passes. In addition, generally, signal levels may differ at wireless communication devices currently communicating with each other. Thus, to switch the wireless transmission methods on a transmitting side according to a link state, information regarding SNR or the like has to be fed back to the transmitting side from a receiving side.

When performing such feedback, ideally, it is desirable to recognize a state of a propagation path on a packet by packet basis before transmitting data packets and to transmit the packets on the basis of the result. However, high-speed communication is necessary to implement such a procedure, which requires dedicated hardware. Thus, a method for switching wireless transmission methods periodically at predetermined intervals but not on a packet by packet basis is employed as a procedure of switching wireless communication methods implemented by software.

However, when software periodically switches wireless transmission methods on the basis of SNR and RSSI, the currently employed wireless transmission method may be switched to a wrong one due to extreme data obtained accidentally, because SNR and RSSI change instantaneously. In addition, when a packet error rate is employed, the wireless transmission method is switched on the basis of the packet error rate of the currently employed wireless transmission method. Accordingly, if the packet error rate of the wireless transmission method becomes worse after the switching, a radical degradation in the packet error rate undesirably occurs periodically, which may make it difficult to employ this switching method for real-time processing.

On the other hand, the distance between wireless communication devices does not significantly change in an instant. In addition, the employable wireless transmission methods can be narrowed down on the basis of the distance. Thus, it is relatively easy to employ the distance.

It is desirable that embodiments of the present invention stabilize the switching operation by using information on distance between wireless communication devices when switching the wireless transmission methods according to a state of a link.

Embodiments of the present invention are made to address the above-described disadvantages. According to an aspect of the present invention, a wireless communication device includes wireless transmitting means configured to perform communication using one of a plurality of predetermined wireless transmission methods, distance measuring means configured to measure a distance between the wireless communication device and a communication partner device, transmission method sorting means configured to sort out one or more suitable wireless transmission methods from the plurality of wireless transmission methods on the basis of the distance measured by the distance measuring means, link quality determining means configured to determine a link quality of the communication, and wireless transmission method determining means configured to determine the wireless transmission method to be employed by the wireless transmitting means according to the link quality from the wireless transmission methods sorted by the transmission method sorting means. This advantageously allows the distance between the wireless communication device and the communication partner device to be reflected when determining the wireless transmission method according to the link quality.

According to the aspect, the link quality determining means may determine the link quality using radio field intensity. Here, a signal to noise ratio and a received signal strength indicator may be employed as an indicator of the radio field intensity. The signal to noise ratio and the received signal strength indicator are parameters that may change irregularly. However, embodiments of the present invention advantageously reduce the effect of such irregular changes by considering the distance.

In addition, when determining the link quality using the radio field intensity, the wireless transmission method determining means may include candidate transmission method choosing means configured to choose one or more candidate wireless transmission methods to be employed by the wireless transmitting means on the basis of the radio field intensity, and transmission method selecting means configured to select one wireless transmission method to be employed by the wireless transmitting means, wherein the selected wireless transmission method is included in the wireless transmission methods sorted by the transmission method sorting means and is also included in the candidate transmission methods. This advantageously allows appropriateness of the candidates chosen on the basis of the radio field intensity to be determined by the distance.

At this time, the transmission method sorting means may sort out one or more selectable wireless transmission methods and a quasi-selectable wireless transmission method as the suitable wireless transmission methods. The transmission method selecting means may select the candidate as the wireless transmission method to be employed by the wireless transmitting means if the candidate is the selectable wireless transmission method. On the other hand, the transmission method selecting means may select the wireless transmission method requiring the lowest radio field intensity from the selectable wireless transmission methods if the candidate is the quasi-selectable wireless transmission method. This advantageously allows the appropriate wireless transmission method to be selected when the candidate selected on the basis of the radio field intensity is also suitable for the distance.

Additionally, the transmission method selecting means may select the wireless transmission method requiring the highest radio field intensity from the wireless transmission methods sorted by the transmission method sorting means if the candidate does not match either of the wireless transmission methods sorted by the transmission method sorting means. This advantageously allows the appropriate wireless transmission method to be selected even if the candidate selected on the basis of the radio field intensity is not suitable for the distance.

Furthermore, according to the aspect, the link quality determining means may determine the link quality using an error rate. Here, a packet error rate can be employed as the error rate. Generally, the wireless transmission method is switched step by step when the switching is based on the error rate. However, when the wireless transmission method is switched to the one requiring high quality, degradation in the quality can be advantageously prevented or reduced by taking the distance into consideration.

In addition, when the link quality is determined using the error rate, the wireless transmission method determining means may include a transmission method selecting means. The transmission method selecting means selects, when the link quality determining means determines that the link quality determined using the error rate is better than a first threshold, the wireless transmission method requiring the radio field intensity higher than that of the wireless transmission method currently employed by the wireless transmitting means as the wireless transmission method to be employed by the wireless transmitting means if the wireless transmission method requiring the higher radio field intensity matches the wireless transmission methods sorted by the transmission method sorting means. On the other hand, the transmission method selecting means selects, when the link quality determining means determines that the link quality determined using the error rate is worse than a second threshold, the wireless transmission method requiring the radio field intensity lower than that of the wireless transmission method currently employed by the wireless transmitting means as the wireless transmission method to be employed by the wireless transmitting means. This advantageously allows the wireless transmission method to be switched when the error rate is out of a range between the first and second thresholds.

Additionally, according to the aspect, the link quality determining means may include a radio field intensity determining means configured to determine the link quality using radio field intensity, and an error rate determining means configured to determine the link quality using an error rate. Furthermore, the wireless transmission method determining means may include a candidate transmission method choosing means configured to choose one or more candidate wireless transmission methods to be employed by the wireless transmitting means on the basis of the radio field intensity, a radio-field-intensity-based transmission method selecting means configured to select one wireless transmission method matching with the candidate from the wireless transmission methods sorted by the transmission method sorting means, an error-rate-based transmission method selecting means configured to select, when the link quality determining means determines that the link quality determined using the error rate is better than a first threshold, the wireless transmission method requiring the radio field intensity higher than that of the wireless transmission method currently employed by the wireless transmitting means if the wireless transmission method requiring the higher radio field intensity is included in the wireless transmission methods sorted by the transmission method sorting means, whereas the error-rate-based transmission method selecting means is configured to select, when the link quality determining means determines that the link quality determined using the error rate is worse than a second threshold, the wireless transmission method requiring the radio field intensity lower than that of the wireless transmission method currently employed by the wireless transmitting means, and a transmission method comparing means configured to compare, when the link quality determining means determines that the link quality determined using the error rate is better than the first threshold, the wireless transmission method selected by the radio-field-intensity-based transmission method selecting means with the wireless transmission method selected by the error-rate-based transmission method selecting means, and to select the wireless transmission method requiring the higher radio field intensity as the one to be employed by the wireless transmitting means, whereas the transmission method comparing means is configured to compare, when the link quality determining means determines that the link quality determined using the error rate is worse than the second threshold, the wireless transmission method selected by the radio-field-intensity-based transmission method selecting means with the wireless transmission method selected by the error-rate-based transmission method selecting means, and to select the wireless transmission method requiring the lower radio field intensity as the one to be employed by the wireless transmitting means. This advantageously allows the wireless transmission method to be selected on the basis of both the radio field intensity and the error rate.

According to another aspect of the present invention, a method of determining a wireless transmission method for a wireless communication device configured to perform communication using one of a plurality of predetermined wireless transmission methods and a program causing a computer to execute the method are provided. The method includes the steps of measuring a distance between the wireless communication device and a communication partner device, determining a link quality of the communication, sorting out one or more suitable wireless transmission methods from the plurality of wireless transmission methods on the basis of the measured distance, and determining the wireless transmission method to be employed for the communication from the sorted wireless transmission methods according to the link quality. This advantageously allows the distance between the wireless communication device and the communication partner device to be reflected when determining the wireless transmission method according to the link quality.

According to embodiments of the present invention, the switching operation is advantageously stabilized by reflecting distance information between wireless communication devices when switching the wireless transmission methods according to a state of a link.

DESCRIPTION OF THE PREFERRED EMBODIMENTS

Now, embodiments of the present invention will be described in detail below with reference to the accompanying drawings.

Figure 1:
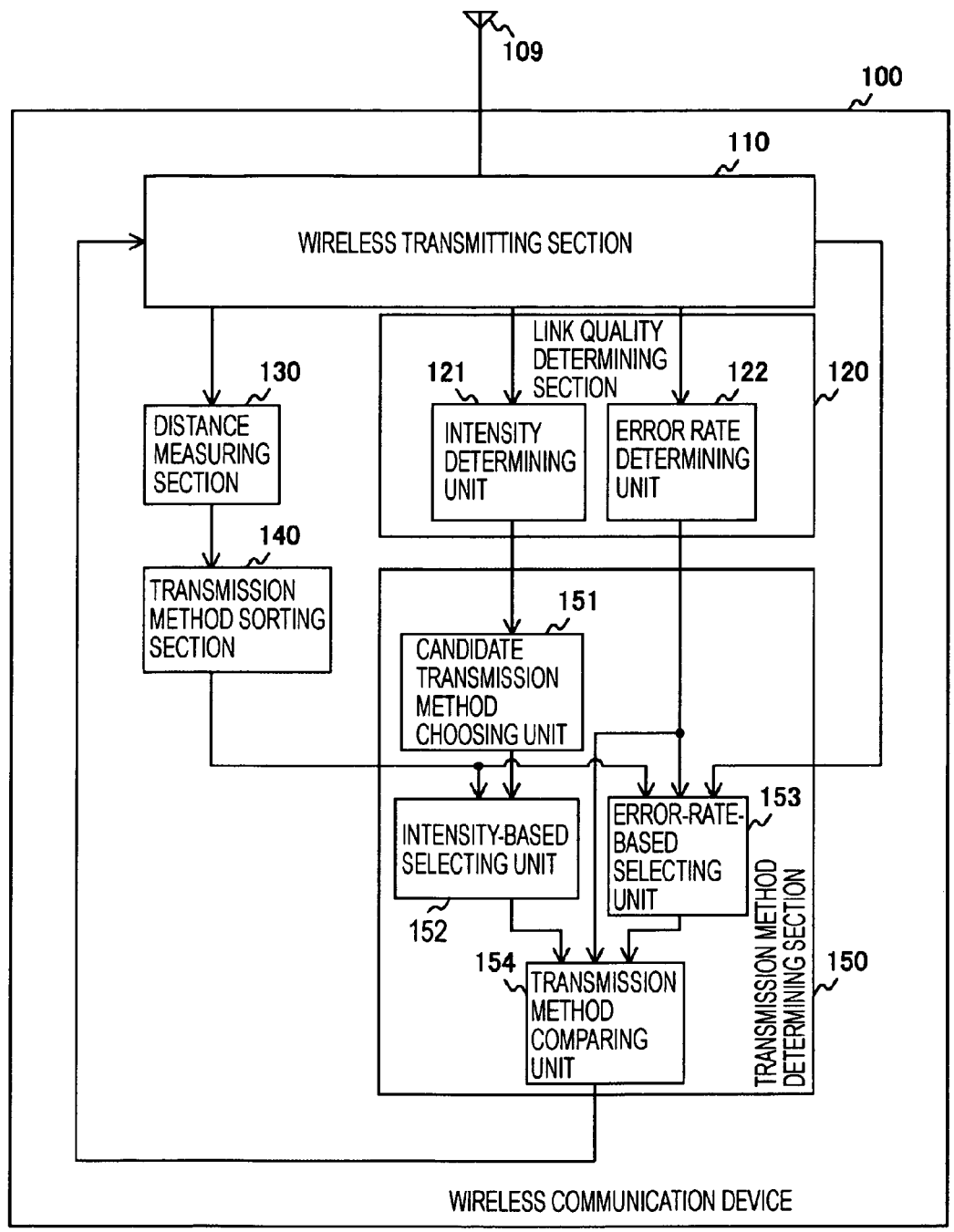
FIG. 1 is a diagram showing an example of a configuration of a wireless communication device 100 according to an embodiment of the present invention.

FIG. 1 is a diagram showing an example of a configuration of a wireless communication device 100 according to an embodiment of the present invention. The wireless communication device 100 includes a wireless transmitting section 110, a link quality determining section 120, a distance measuring section 130, a transmission method sorting section 140, and a transmission method determining section 150.

The wireless transmitting section 110 wirelessly communicates with other wireless communication devices. The wireless transmitting section 110 performs wireless communication according to a wireless transmission method selected from a plurality of predetermined wireless transmission methods. In addition, the wireless transmitting section 110 is connected to an antenna 109, through which the wireless transmitting section 110 communicates with other wireless communication devices.

The link quality determining section 120 determines the quality of the communication link (i.e., a propagation path) established by the wireless transmitting section 110. The link quality determining section 120 includes a radio field intensity determining unit 121 (hereinafter, referred to as an "intensity determining unit 121") and an error rate determining unit 122. The intensity determining unit 121 determines the link quality on the basis of the radio field intensity such as, for example, an SNR (Signal to noise Ratio) or an RSSI (Received Signal Strength intensity Indicator). In addition, the error rate determining unit 122 determines the link quality on the basis of an error rate such as, for example, a PER (Packet Error Rate).

The distance measuring section 130 measures a distance between the wireless communication device 100 and a wireless communication partner (i.e., another wireless communication device). The distance measuring section 130 can employ various measuring methods. For example, the distance measuring section 130 may measure a time period from transmission of a packet to a communication partner until reception of a response packet for the transmitted packet. A propagation time through a space is obtained by subtracting a time period specific to each wireless communication device from the measured time period, and dividing the obtained value by two. A value obtained by multiplying the propagation time by the radio propagation velocity ($=3\times10^8$ [m/sec]) represents the distance (see, for example, Japanese Unexamined Patent Application Publication No. 2004-289815). However, the measuring method is not limited to this particular example, and the distance measuring section 130 can employ other methods such as, for example, a GPS (Global Positioning System).

The transmission method sorting section 140 sorts out wireless transmission methods suitable for the measured distance from a plurality of predetermined wireless transmission methods to be employed by the wireless transmitting section 110 on the basis of the distance to the communication partner measured by the distance measuring section 130. Generally, a higher SNR is required for the wireless transmission method that implements a higher transmission speed. SNRs depend on a modulation level, a spreading factor, and an error correction coding rate of wireless communication methods. Accordingly, the embodiment of the present invention grants higher priorities to the wireless transmission methods for which a higher SNR is required, and employs the wireless transmission method having the higher priority according to the link quality. The transmission method sorting section 140 first reduces the number of wireless transmission methods on the basis of the distance to the communication partner. The transmission method determining section 150 then selects the wireless transmission method according to the link quality.

That is, the transmission method determining section 150 determines the wireless transmission method to be employed by the wireless transmitting section 110 according to the link quality from the wireless transmission methods sorted by the transmission method sorting section 140. The transmission method determining section 150 includes a candidate transmission method choosing unit (hereinafter, referred to as a "candidate choosing unit") 151, a radio-field-intensity-based selecting unit (hereinafter, referred to as an "intensity-based selecting unit") 152, an error-rate-based selecting unit 153, and a transmission method comparing unit (hereinafter, referred to as a "comparing unit") 154.

The candidate choosing unit 151 in the transmission method determining section 150 chooses one or more wireless transmission methods suitable for the radio field intensity determined by the intensity determining unit 121 as the candidate wireless transmission method to be employed by the wireless transmitting section 110. More specifically, when the radio field intensity is high (e.g., when the SNR is high), the candidate choosing unit 151 chooses one or more wireless transmission methods having a higher transmission speed (i.e., a method requiring a higher SNR). On the other hand, when the radio field intensity is low (e.g., when the SNR is low), the candidate choosing unit 151 chooses one or more the wireless transmission methods having a lower transmission speed (i.e., a method requiring a lower SNR). The wireless transmission methods chosen by the candidate choosing unit 151 are only candidates, and are further selected by the intensity-based selecting unit 152.

The intensity-based selecting unit 152 selects the wireless transmission method to be employed by the wireless transmitting section 110 according to output of the candidate choosing unit 151 and the transmission method sorting section 140 on the basis of the radio field intensity. More specifically, the intensity-based selecting unit 152 first determines whether or not the candidate wireless transmission methods chosen by the candidate choosing unit 151 match the wireless transmission methods suitable for the distance sorted by the transmission method sorting section 140. According to the determination result, the intensity-based selecting unit 152 selects the wireless transmission method to be employed in the wireless transmitting section 110.

The error-rate-based selecting unit 153 selects the wireless transmission method to be employed in the wireless transmitting section 110 on the basis of the error rate. This selection is made on the basis of the output of the error rate determining unit 122 and the transmission method sorting section 140 and the currently employed wireless transmission method. More specifically, when the link quality is high, the error-rate-based selecting unit 153 selects one of the wireless transmission methods having a transmission speed higher than that of the current one (i.e., a method requiring a higher SNR) on the basis of the error rate determined by the error rate determining unit 122. On the other hand, when the link quality is low, the error-rate-based selecting unit 153 selects one of the wireless transmission methods having a transmission speed lower than that of the currently employed wireless transmission method (i.e., a method requiring a lower SNR). However, when a wireless transmission method to be selected having a higher transmission speed does not match the wireless transmission methods suitable for the distance sorted by the transmission method sorting section 140, the error-rate-based selecting unit 153 determines to keep using the current wireless transmission method.

The comparing unit 154 compares the wireless transmission method selected by the intensity-based selecting unit 152 with the wireless transmission method selected by the error-rate-based selecting unit 153, and appropriately selects either one on the basis of the determination result of the error rate determining unit 122. More specifically, when the link quality is high, the comparing unit 154 selects a wireless transmission method having a higher transmission speed (i.e., a method requiring a higher SNR) from those selected by the intensity-based selecting unit 152 and the error-rate-based selecting unit 153 on the basis of the error rate determined by the error rate determining unit 122. On the other hand, when the link quality is low, the comparing unit 154 selects a wireless transmission method having a lower transmission speed (i.e., a method requiring a lower SNR) from those selected by the intensity-based selecting unit 152 and the error-rate-based selecting unit 153.

In this embodiment, the comparing unit 154 selects one of the wireless transmission methods selected by the intensity-based selecting unit 152 and the error-rate-based selecting unit 153. However, the wireless transmission method selected by the intensity-based selecting unit 152 or the error-rate-based selecting unit 153 can be directly employed by the wireless transmitting section 110.

When the wireless transmission method is selected on the basis of an instantaneous value of the radio field intensity, temporal changes in the radio field intensity may affect the link quality of the selected wireless transmission method because an extreme instantaneous value may be employed. The wireless transmission method selected by the intensity-based selecting unit 152 according to the embodiment of the present invention is less affected by such changes. On the other hand, the wireless transmission method selected on the basis of the error rate is switched to another one gradually from the current wireless transmission method. Thus, this type of selection method may not sufficiently cope with the radical change in the link quality.

Accordingly, in the embodiment of the present invention, the comparing unit 154 compares the wireless transmission methods selected on the basis of the radio field intensity and the error rate so as to obtain advantages of the both selection methods. More specifically, when the link quality is high, a wireless transmission method having a higher transmission speed (i.e., a method requiring a higher SNR) is selected. Thus, an increase in SNR that occurs when the distance between the wireless communication devices suddenly becomes small can be coped with. On the other hand, when the link quality is low, a wireless transmission method having a lower transmission speed (i.e., a method requiring a lower SNR) is selected. Thus, a decrease in SNR that occurs when the distance between the wireless communication devices becomes suddenly large or that is caused by interference or jamming can be coped with.

Figure 2A:
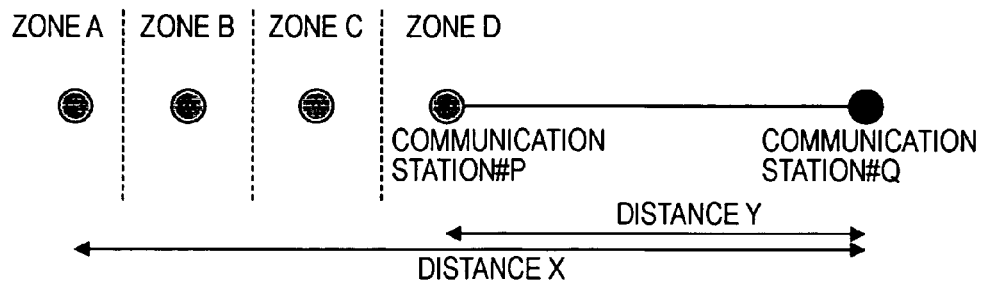
FIGS. 2A, 2B, and 2C are diagrams showing an example method of handling a distance according to an embodiment of the preset invention.
Figure 2B:
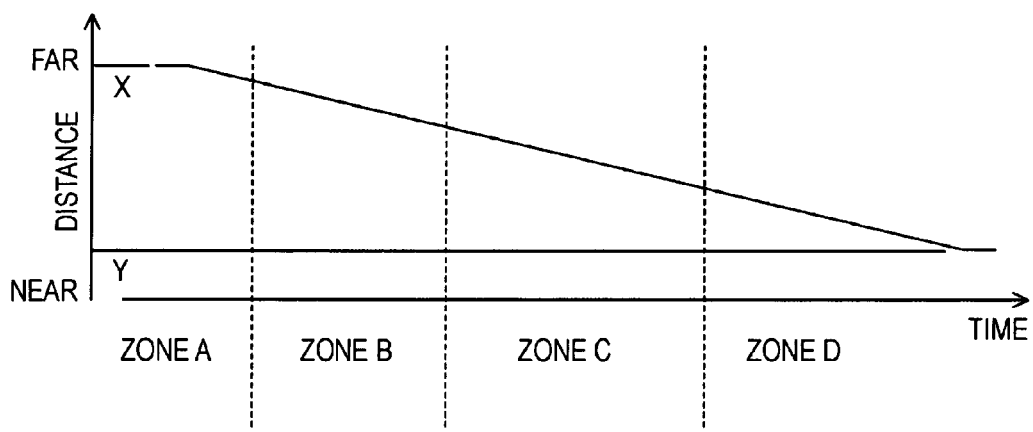
Figure 2C:
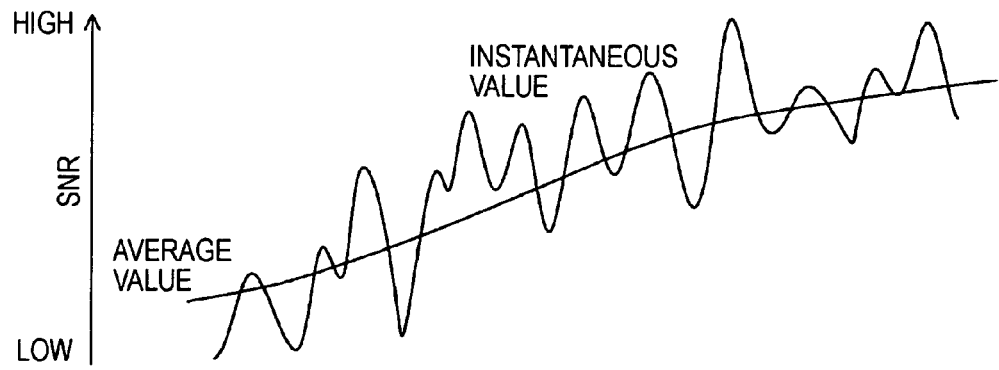

FIGS. 2A, 2B, and 2C are diagrams showing an example of handling of a change in distance according to an embodiment of the present invention. As shown in FIG. 2A, suppose that two wireless communication devices, i.e., communication stations #P and #Q, are moved relative to one another within a range from a distance X to a distance Y when the communication stations #P and #Q wirelessly communicate with each other. In an embodiment of the present invention, the range from distance X to the distance Y is divided into four zones, namely, zones A, B, C, and D. More specifically, the zone A denotes a range substantially equal to the distance X, whereas the zone D denotes a range substantially equal to the distance Y. The area between the zones A and D is divided into the zones B and C.

Now, suppose that the distance between the communication stations #P and #Q changes from the distance X to the distance Y during the wireless communication as shown in FIG. 2B. At this time, as shown in FIG. 2C, the average value of SNR gradually changes from a lower value to a higher value according to the movement of the communication stations. However, since the actual instantaneous SNR value changes irregularly, it is difficult to recognize a real link quality with long sampling intervals. Thus, the embodiment of the present invention focuses on correlation between the distance between two communication devices and the link quality, and narrows the candidate wireless transmission methods down on the basis of the distance.

Figure 3:
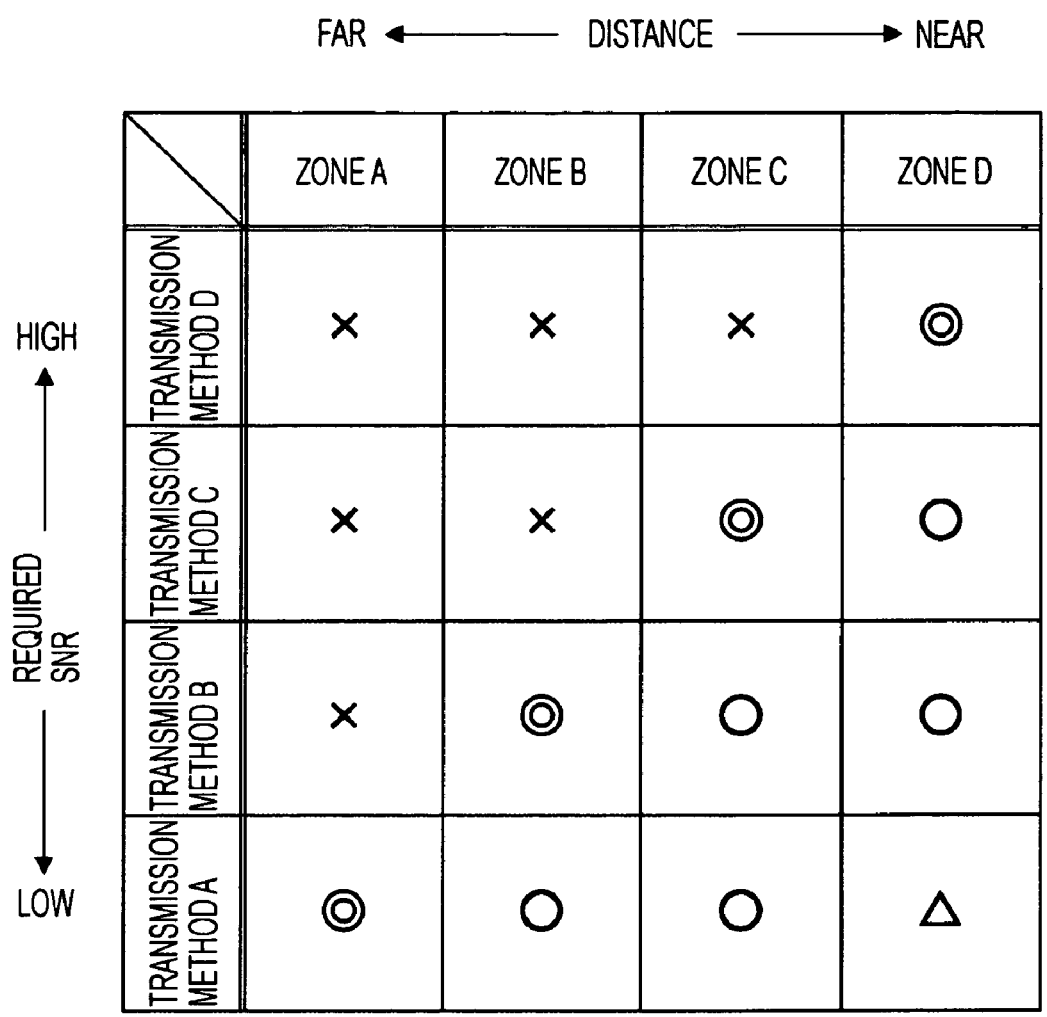
FIG. 3 is a diagram showing an example correspondence between a distance and wireless transmission methods according to an embodiment of the present invention.

FIG. 3 is a diagram showing an example of a correspondence between distances and wireless transmission methods according to an embodiment of the present invention. In this example, four zones A to D are shown in a horizontal direction, whereas four wireless transmission methods A to D are shown in a vertical direction. As mentioned above, regarding the zones A to D, the zone A denotes the farthest distance, whereas the zone D denotes the closest distance. On the other hand, regarding the wireless transmission methods A to D, the wireless transmission method A denotes a wireless transmission method having the lowest transmission speed (i.e., the lowest required SNR), whereas the wireless transmission method D denotes a wireless transmission method having the highest transmission speed (i.e., the highest required SNR).

In FIG. 3, symbols written in intersections of the zone columns and the wireless transmission method rows have following meanings. Firstly, symbols "●" and "○" indicate that the wireless transmission method is selectable in the zone. The wireless transmission methods with the symbols "●" and "○" are referred to as "selectable wireless transmission methods". Particularly, the wireless transmission method with the symbol "●" is the standard method, and is referred to as a "standard wireless transmission method". Additionally, a symbol "Δ" indicates that the wireless transmission method is selectable but more preferable wireless transmission methods exist. The method with the symbol "Δ" is referred to as a "quasi-selectable wireless transmission method". Furthermore, a symbol "x" indicates that the wireless transmission method is not selectable in the zone. The wireless transmission method with the symbol "x" is referred to as an "unselectable wireless transmission method".

For example, in the zone B, the wireless transmission method B is the standard wireless transmission method, and is usually employed. In this case, the wireless transmission method A is also selectable. When the link quality decreases, the wireless transmission method A is employed.

In addition, for example, since the distance is the smallest in the zone, the wireless transmission method D having the highest transmission speed (i.e., having the highest required SNR) is usually employed in the zone D. In this example case, the wireless transmission methods A to C are also selectable. When the link quality decreases, these wireless transmission methods are appropriately employed. However, it is inefficient to select the wireless transmission method A, i.e., the quasi-selectable wireless transmission method, when the distance is small like in the zone D. Thus, it is preferable not to select the wireless transmission method A when the selection of the wireless transmission method A is based on factors with a low confidence level. Here, the factors with a low confidence level may be, for example, a case where the wireless transmission method is selected on the basis of an instantaneous SNR (or RSSI, etc.) value. That is, adoption of a concept of "quasi-selectable wireless transmission method" allows the selection of a suitable wireless transmission method even if the link quality is estimated using the instantaneous value.

Figure 4:
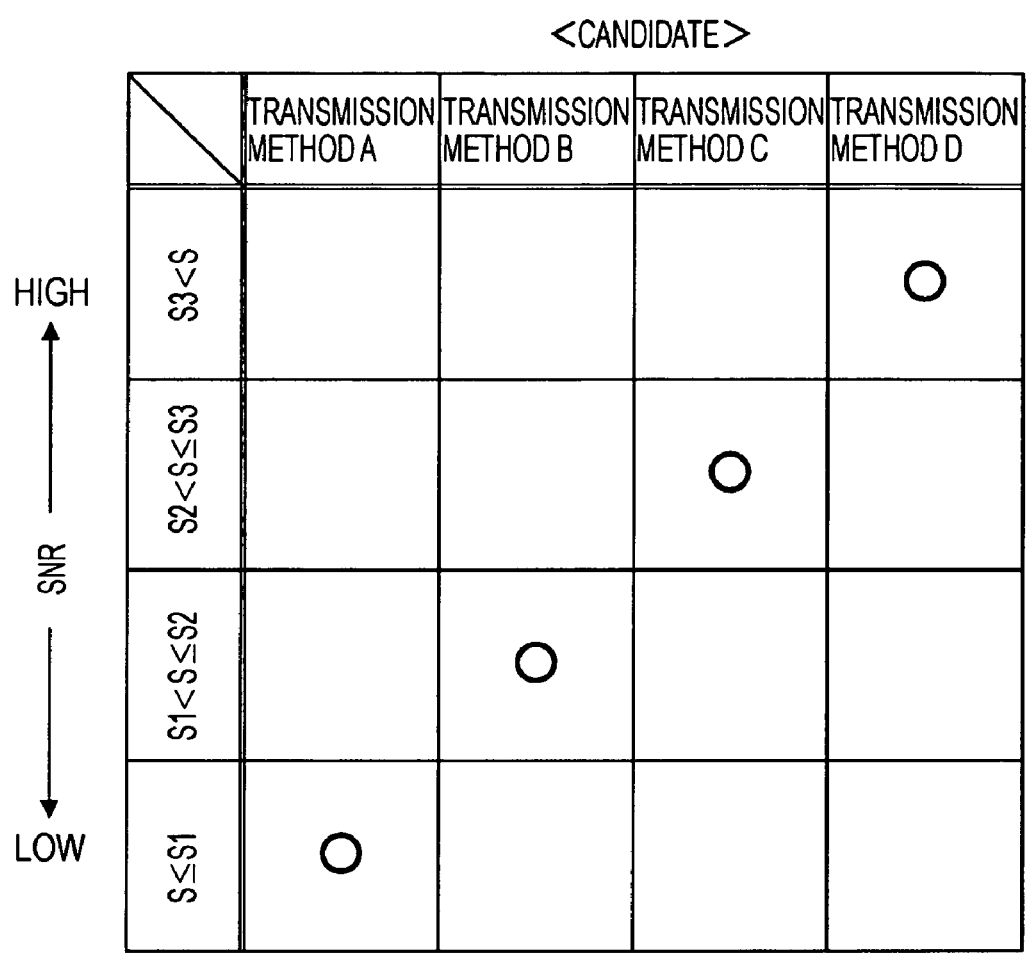
FIG. 4 is a diagram showing an example correspondence between a signal to noise ratio and wireless transmission methods according to an embodiment of the present invention.

FIG. 4 is a diagram showing an example of a correspondence between SNRs and candidate wireless transmission methods according to an embodiment of the present invention. When the candidate choosing unit 151 chooses the candidate wireless transmission method on the basis of the radio field intensity determined by the intensity determining unit 121, the candidate choosing unit 151 chooses the wireless transmission method having the intersectional symbol "○" as the candidate. In this example, an SNR (denoted by "S" in the figure) is employed as an indicator of the radio field intensity.

For example, if the SNR is at or lower than S1, the wireless transmission method A is chosen as the candidate. In addition, if the SNR is higher than S1 and at or lower than S2, the wireless transmission method B is chosen as the candidate. Likewise, if the SNR is higher than S2 and at or lower than S3, the wireless transmission method C is chosen as the candidate. Additionally, the SNR is higher than S3, the wireless transmission method D is chosen as the candidate.

When the radio field intensity is employed as the link quality determination criterion, the intensity-based selecting unit 152 determines whether or not the candidate selected according to the correspondence shown in FIG. 4 matches the correspondence shown in FIG. 3, and selects the suitable wireless transmission method. On the other hand, when the error rate is employed as the link quality determination criterion, the error-rate-based selecting unit 153 changes the transmission speed (i.e., the required SNR) of the wireless transmission method from that of the currently employed wireless transmission method.

Figure 5:
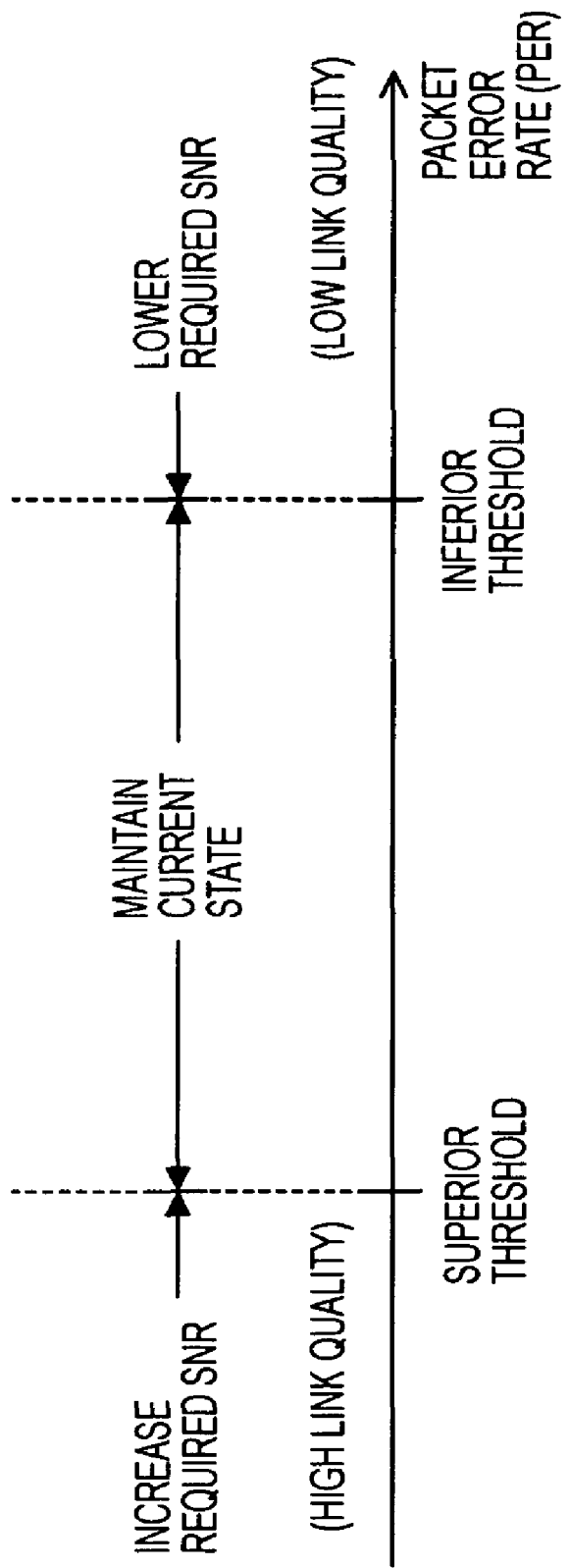
FIG. 5 is a diagram showing an example correspondence between a packet error rate and wireless transmission methods according to an embodiment of the present invention.

FIG. 5 is a diagram showing an example of a correspondence between a packet error rate and a wireless transmission method according to an embodiment of the present invention. In this example, a superior threshold and an inferior threshold are determined for the packet error rate. The superior threshold denotes a threshold of the packet error rate, which indicates the high link quality. On the other hand, the inferior threshold denotes a threshold of the packet error rate, which indicates the low link quality.

When the error rate determining unit 122 determines that the packet error rate is higher than the inferior threshold, the link quality is low. Thus, the error-rate-based selecting unit 153 selects a wireless transmission method having a transmission speed lower than that of the current wireless transmission method by one step (i.e., a method requiring an SNR that is one-step lower).

On the other hand, if the packet error rate is lower than the superior threshold, the link quality is high. Thus, the error-rate-based selecting unit 153 selects a wireless transmission method having a transmission speed higher than that of the current wireless transmission method by one step (i.e., a method requiring an SNR that is one-step higher). However, if the wireless transmission method having the higher transmission speed by one step is the unselectable wireless transmission method mentioned in FIG. 3, the current wireless transmission method continues to be employed.

In addition, if the packet error rate is at or higher than the superior threshold and is at or lower than the inferior threshold, the error-rate-based selecting unit 153 determines that the change of the wireless transmission method is unnecessary, and selects the current wireless transmission method.

An operation of a wireless communication device according to an embodiment of the present invention will be described next with reference to the drawings.

Figure 6:
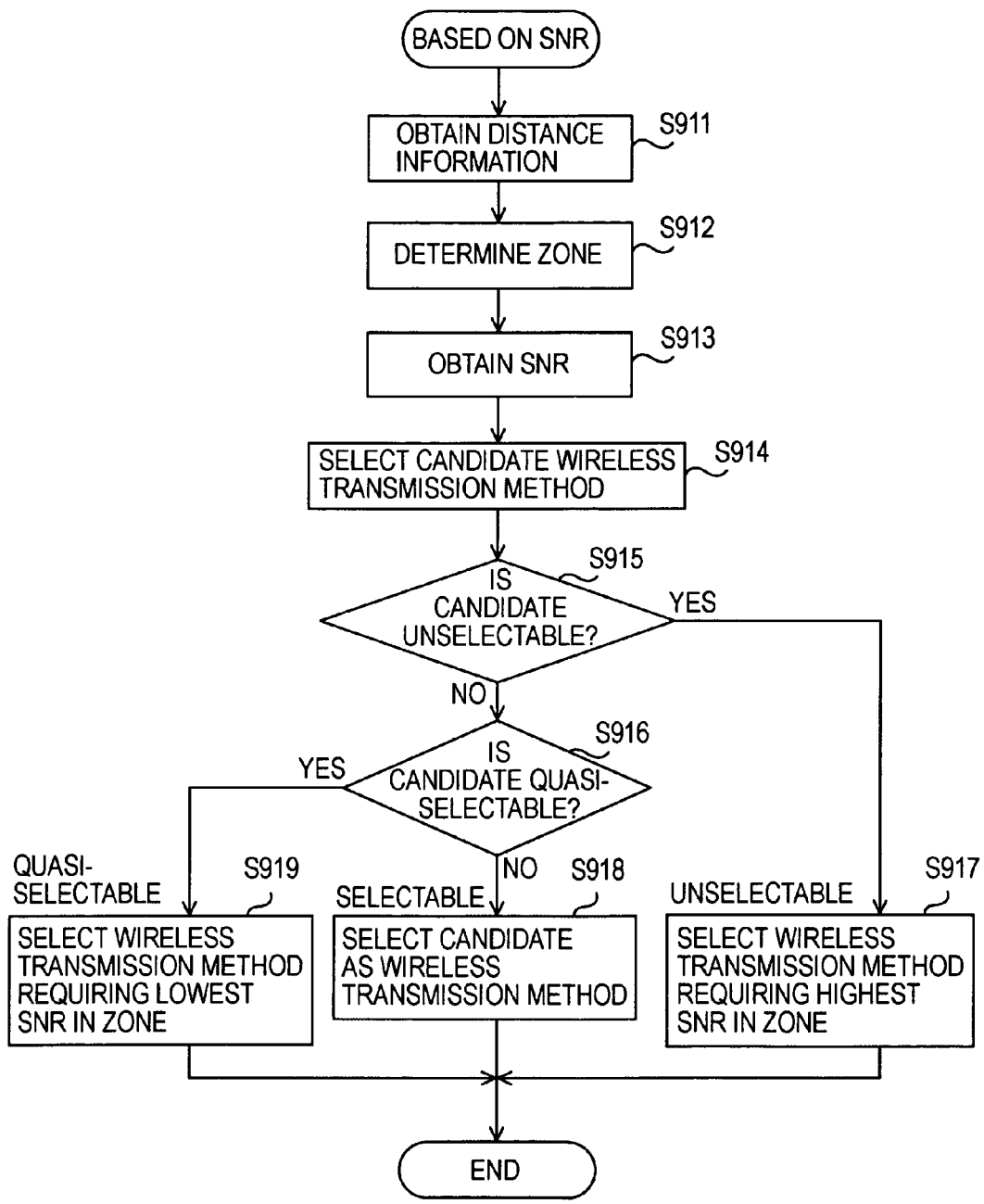
FIG. 6 is a diagram showing an example procedure of selecting a wireless transmission method on the basis of a signal to noise ratio according to an embodiment of the present invention.

FIG. 6 is a diagram showing an example procedure of selecting a wireless transmission method on the basis of an SNR according to the embodiment of the present invention. The distance measuring section 130 obtains information on the distance between the wireless communication device and the communication partner (at STEP S911). The distance measuring section 130 determines one of zones on the basis of the distance (at STEP S912).

In addition, the intensity determining unit 121 obtains an SNR (at STEP S913). The candidate choosing unit 151 chooses the candidate wireless transmission method on the basis of the obtained SNR (at STEP S914). The intensity-based selecting unit 152 determines whether or not the candidate matches the wireless transmission methods sorted by the transmission method sorting section 140 in the following manner.

If the candidate wireless transmission method is the unselectable wireless transmission method (YES at STEP S915), the intensity-based selecting unit 152 selects a wireless transmission method having the highest transmission speed (i.e., a method requiring a highest SNR) from the selectable wireless transmission methods in the zone (at STEP S917).

On the other hand, if the candidate wireless transmission method is a quasi-selectable wireless transmission method (Yes at STEP S916), the intensity-based selecting unit 152 selects a wireless transmission method having the lowest transmission speed (i.e., the lowest required SNR) from the selectable wireless transmission methods in the zone (at STEP S919).

In any other case, i.e., if the candidate wireless transmission method is the selectable wireless transmission method, the candidate wireless transmission method is selected (at STEP S918).

Figure 7:
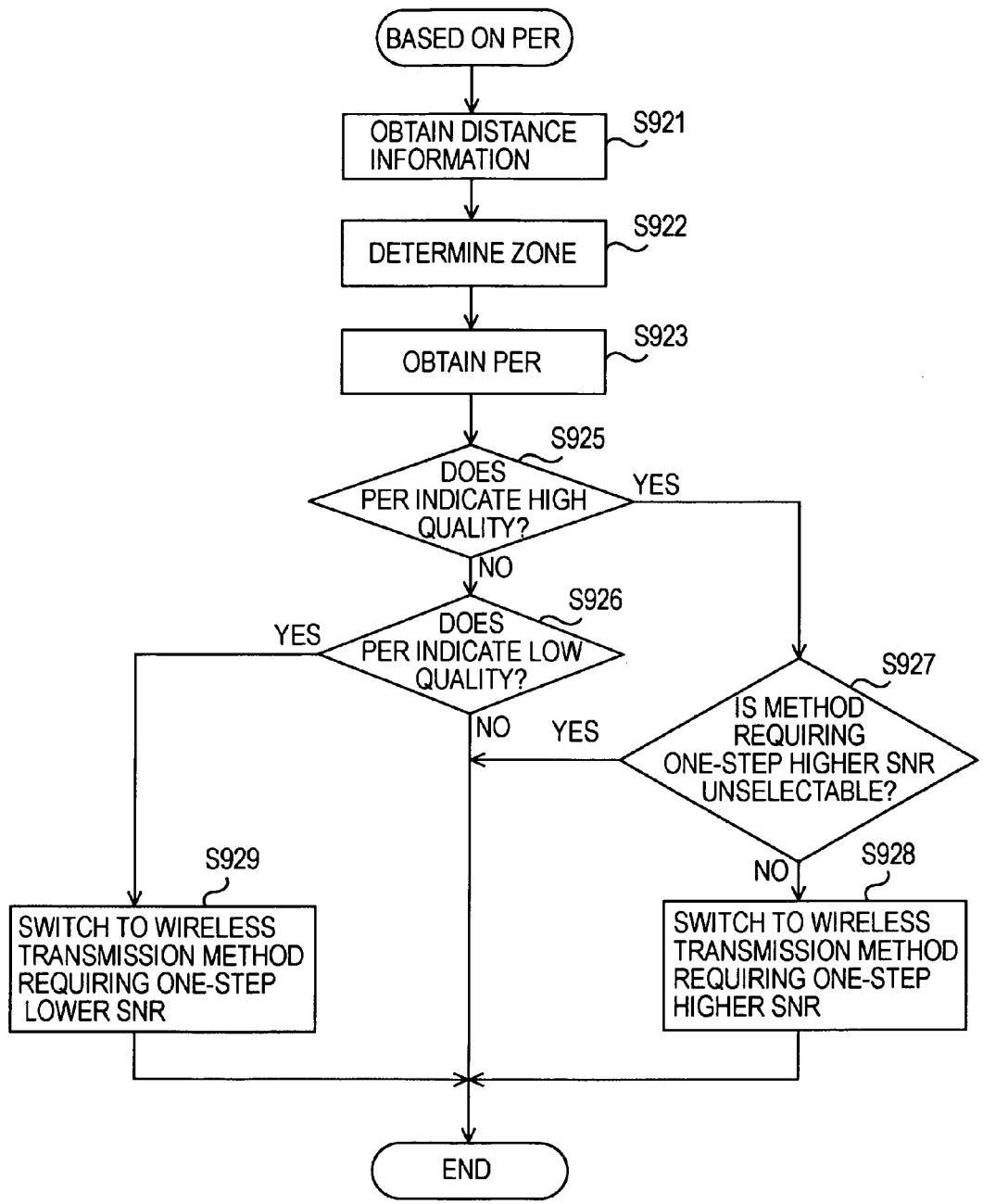
FIG. 7 is a diagram showing an example procedure of selecting a wireless transmission method on the basis of a packet error rate according to an embodiment of the present invention.

FIG. 7 is a diagram showing an example procedure of selecting a wireless transmission method on the basis of a packet error rate (PER) according to an embodiment of the present invention. The distance measuring section 130 obtains information on the distance between the wireless communication device and the communication partner (at STEP S921). The distance measuring section 130 determines one of zones on the basis of the distance (at STEP S922). These steps are the same as in the case where SNR is employed as the criterion.

The error rate determining unit 122 then obtains the packet error rate (at STEP S923). The error-rate-based selecting unit 153 determines whether or not the packet error rate is out of a predetermined range in the following manner.

If the packet error rate is lower than the superior threshold, i.e., if the link quality is high (Yes at STEP S925), the error-rate-based selecting unit 153 selects a wireless transmission method having a transmission speed higher than that of current one by one step (i.e., the required SNR is higher by one step) (at STEP S928). However, when the candidate wireless transmission method is the unselectable wireless transmission method, processing at STEP S928 is not performed (Yes at STEP S927), and the current wireless transmission method continues to be employed.

On the other hand, if the packet error rate is higher than the inferior threshold, i.e., the link quality is low (Yes at STEP S926), the error-rate-based selecting unit 153 selects a wireless transmission method having a transmission speed lower than that of current one by one step (i.e., the required SNR is lower by one step) (at STEP S929).

Figure 8:
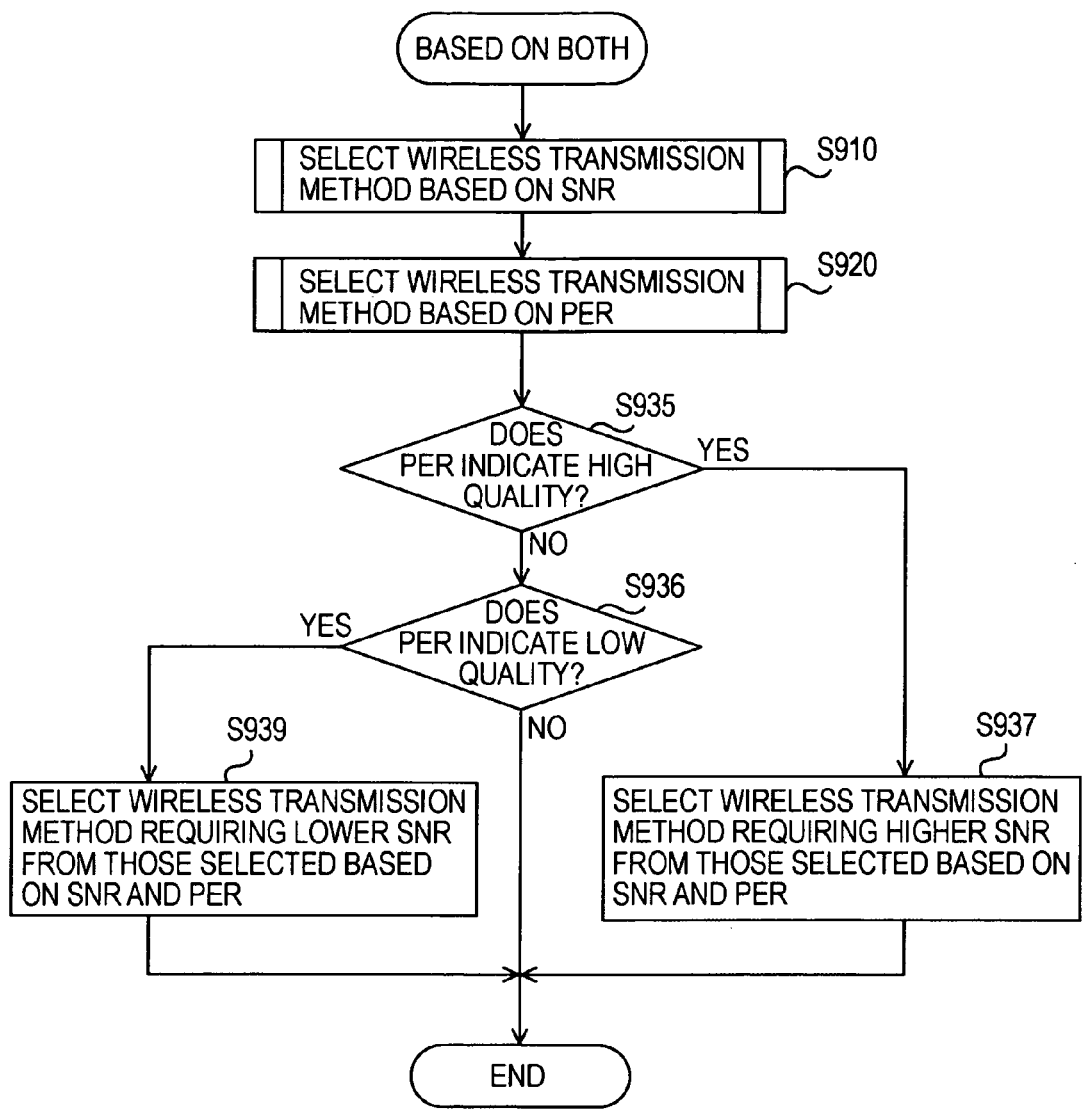
FIG. 8 is a diagram showing an example procedure of selecting a wireless transmission method on the basis of both a signal to noise ratio and a packet error rate according to an embodiment of the present invention.

FIG. 8 is a diagram showing an example procedure of selecting a wireless transmission method on the basis of an SNR and a packet error rate according to an embodiment of the present invention. A wireless transmission method is selected on the basis of the SNR according to the same procedure shown in FIG. 6 (at STEP S910). In addition, a wireless transmission method is then selected on the basis of the error rate according to the same procedure shown in FIG. 7 (at STEP S920). The comparing unit 154 selects the wireless transmission method selected on the basis of the radio field intensity or the error rate depending on whether or not the packet error rate determined by the error rate determining unit 122 is outside of a predetermined range in the following manner.

If the packet error rate is lower than the superior threshold, i.e., the link quality is high (Yes at STEP S935), the comparing unit 154 compares the wireless transmission methods selected on the basis of the radio field intensity and the error rate. The comparing unit 154 then selects the one having the higher transmission speed (i.e., the higher required SNR) (at STEP S937).

On the other hand, when the packet error rate is higher than the inferior threshold, i.e., the link quality is low (Yes at STEP S936), the comparing unit 154 compares the wireless transmission methods selected on the basis of the radio field intensity and the error rate. The comparing unit 154 then selects the one having the lower transmission speed (i.e., the lower required SNR) (at STEP S939).

In addition, if the packet error rate does not fall into any of the above-described cases, the current wireless transmission method is not changed and continues to be employed.

As described above, according to the embodiments of the present invention, the suitable wireless transmission method is selected from those sorted by the transmission method sorting section 140 on the basis of the distance measured by the distance measuring section 130. Thus, the stable switching of wireless transmission methods can be performed according to the link quality.

More specifically, if an SNR is used as the criterion, the wireless transmission method corresponding to the distance is selected, which can reduce the effects of the estimation using the instantaneous value. In addition, the packet error rate is used as the criterion, whether or not the wireless transmission method having the higher transmission speed by one step is suitable for the distance is determined, which allows an accurate response to the positional changes. In addition, if the wireless transmission method is selected on the basis of both the SNR and the packet error rate, a wireless transmission method corresponding to not only a gradual distance change but also a radical distance change is selected, which allows an accurate response to the radical positional change.

Embodiments of the present invention are only examples that embody the present invention, and have the following correspondence with the features described in the claims. However, it should be noted that the present invention is not limited to these embodiments, and various modifications can be made without departing from the spirit and scope of the present invention.

More specifically, according to an embodiment of the present invention, wireless transmitting means corresponds to, for example, a wireless transmitting section 110. In addition, distance measuring means corresponds to, for example, a distance measuring section 130. Additionally, transmission method sorting means corresponds to, for example, a transmission method sorting section 140. Furthermore, link quality determining means corresponds to, for example, a link quality determining section 120. Moreover, wireless transmission method determining means corresponds to, for example, a transmission method determining section 150.

In addition, according to another embodiment of the present invention, candidate transmission method choosing means and transmission method selecting means correspond to, for example, a candidate transmission method choosing unit 151 and a radio-field-intensity-based selecting unit 152, respectively.

Additionally, according to still another embodiment of the present invention, transmission method selecting means corresponds to, for example, an error-rate-based selecting unit 153. In addition, a first threshold and a second threshold correspond to, for example, a superior threshold and an inferior threshold, respectively.

Furthermore, according to a further embodiment of the present invention, radio field intensity determining means and error rate determining means correspond to, for example, a radio field intensity determining unit 121 and an error rate determining unit 122, respectively. In addition, candidate transmission method choosing means corresponds to, for example, a candidate transmission method choosing unit 151. Additionally, radio-field-intensity-based transmission method selecting means and error-rate-based transmission method selecting means correspond to, for example, a radio-field-intensity-based selecting unit 152 and an error-rate-based selecting unit 153, respectively. Furthermore, a first threshold and a second threshold correspond to, for example, a superior threshold and an inferior threshold, respectively. Furthermore, transmission method comparing means corresponds to, for example, a transmission method comparing unit 154.

Moreover, according to a still further embodiment of the present invention, a step of measuring a distance between a wireless communication device and a communication partner device corresponds to, for example, a step S911 or S921. In addition, a step of determining a link quality of communication corresponds to, for example, a step S913 or S923. Additionally, a step of sorting wireless transmission methods suitable for the measured distance from a plurality of wireless transmission method corresponds to, for example, steps S915 and S916 or a step S927. Furthermore, a step of selecting a wireless transmission method to be employed in the communication from the sorted wireless transmission methods according to the link quality corresponds to, for example, steps S917 to S919 or S928 to 929.

The procedure described in the embodiments of the preset invention may be considered as a method having the series of steps. Alternatively, the procedure may be considered as a program causing a computer to execute the series of steps or a storage medium storing the program.

What is claimed is:

1. A wireless communication device comprising:
wireless transmitting means configured to perform communication using one of a plurality of predetermined wireless transmission methods;
distance measuring means configured to measure a distance between the wireless communication device and a communication partner device;
transmission method sorting means configured to sort out one or more suitable wireless transmission methods from the plurality of wireless transmission methods on the basis of the distance measured by the distance measuring means;
link quality determining means configured to determine a link quality of the communication; and
wireless transmission method determining means configured to determine the wireless transmission method to be employed by the wireless transmitting means according to the link quality from the wireless transmission methods sorted by the transmission method sorting means;
wherein the link quality determining means determines the link quality using radio field intensity;
the wireless transmission method determining means includes
candidate transmission method choosing means configured to choose one or more candidate wireless transmission methods to be employed by the wireless transmitting means on the basis of the radio field intensity, and
transmission method selecting means configured to select one wireless transmission method to be employed by the wireless transmitting means, wherein the selected wireless transmission method is included in the wireless transmission methods sorted by the transmission method sorting means and is also included in the candidate transmission methods;
the transmission method sorting means sorts out one or more selectable wireless transmission methods and a quasi-selectable wireless transmission method as the suitable wireless transmission methods, and
the transmission method selecting means selects the candidate as the wireless transmission method to be employed by the wireless transmitting means if the candidate is the selectable wireless transmission method, whereas the transmission method selecting means selects the wireless transmission method requiring the lowest radio field intensity from the selectable wireless transmission methods if the candidate is the quasi-selectable wireless transmission method.

2. A wireless communication device comprising:
wireless transmitting means configured to perform communication using one of a plurality of predetermined wireless transmission methods;
distance measuring means configured to measure a distance between the wireless communication device and a communication partner device;
transmission method sorting means configured to sort out one or more suitable wireless transmission methods from the plurality of wireless transmission methods on the basis of the distance measured by the distance measuring means;
link quality determining means configured to determine a link quality of the communication; and
wireless transmission method determining means configured to determine the wireless transmission method to be employed by the wireless transmitting means according to the link quality from the wireless transmission methods sorted by the transmission method sorting means;
wherein the link quality determining means determines the link quality using an error rate;
the wireless transmission method determining means includes a transmission method selecting means, and
the transmission method selecting means selects, when the link quality determining means determines that the link quality determined using the error rate is better than a first threshold, the wireless transmission method requiring the radio field intensity higher than that of the wireless transmission method currently employed by the wireless transmitting means as the wireless transmission method to be employed by the wireless transmitting means if the wireless transmission method requiring the higher radio field intensity matches with the wireless transmission methods sorted by the transmission method sorting means, whereas the transmission method selecting means selects, when the link quality determining means determines that the link quality determined using the error rate is worse than a second threshold, the wireless transmission method requiring the radio field intensity lower than that of the wireless transmission method currently employed by the wireless transmitting means as the wireless transmission method to be employed by the wireless transmitting means.

3. A wireless communication device comprising:
wireless transmitting means configured to perform communication using one of a plurality of predetermined wireless transmission methods;
distance measuring means configured to measure a distance between the wireless communication device and a communication partner device;
transmission method sorting means configured to sort out one or more suitable wireless transmission methods from the plurality of wireless transmission methods on the basis of the distance measured by the distance measuring means;
link quality determining means configured to determine a link quality of the communication; and
wireless transmission method determining means configured to determine the wireless transmission method to be employed by the wireless transmitting means according to the link quality from the wireless transmission methods sorted by the transmission method sorting means;

wherein the link quality determining means includes
- a radio field intensity determining means configured to determine the link quality using radio field intensity, and
- an error rate determining means configured to determine the link quality using an error rate, and wherein the wireless transmission method determining means includes
- a candidate transmission method choosing means configured to choose one or more candidate wireless transmission methods to be employed by the wireless transmitting means on the basis of the radio field intensity,
- a radio-field-intensity-based transmission method selecting means configured to select one wireless transmission method matching with the candidate from the wireless transmission methods sorted by the transmission method sorting means,
- an error-rate-based transmission method selecting means configured to select, when the link quality determining means determines that the link quality determined using the error rate is better than a first threshold, the wireless transmission method requiring the radio field intensity higher than that of the wireless transmission method currently employed by the wireless transmitting means if the wireless transmission method requiring the higher radio field intensity is included in the wireless transmission methods sorted by the transmission method sorting means, whereas the error-rate-based transmission method selecting means is configured to select, when the link quality determining means determines that the link quality determined using the error rate is worse than a second threshold, the wireless transmission method requiring the radio field intensity lower than that of the wireless transmission method currently employed by the wireless transmitting means, and
- a transmission method comparing means configured to compare, when the link quality determining means determines that the link quality determined using the error rate is better than the first threshold, the wireless transmission method selected by the radio-field-intensity-based transmission method selecting means with the wireless transmission method selected by the error-rate-based transmission method selecting means, and to select the wireless transmission method requiring the higher radio field intensity as the one to be employed by the wireless transmitting means, whereas the transmission method comparing means is configured to compare, when the link quality determining means determines that the link quality determined using the error rate is worse than the second threshold, the wireless transmission method selected by the radio-field-intensity-based transmission method selecting means with the wireless transmission method selected by the error-rate-based transmission method selecting means, and to select the wireless transmission method requiring the lower radio field intensity as the one to be employed by the wireless transmitting means.

\* \* \* \* \*